3,468,078
HONING TOOLS
Peter Nagel, Hindenburgstrasse 58, Nuertingen, Wurttemberg, and Gerhard Wagner, Zizishausen, Wurttemberg, Germany
Filed May 10, 1967, Ser. No. 637,428
Int. Cl. B24b 9/02
U.S. Cl. 51—346            5 Claims

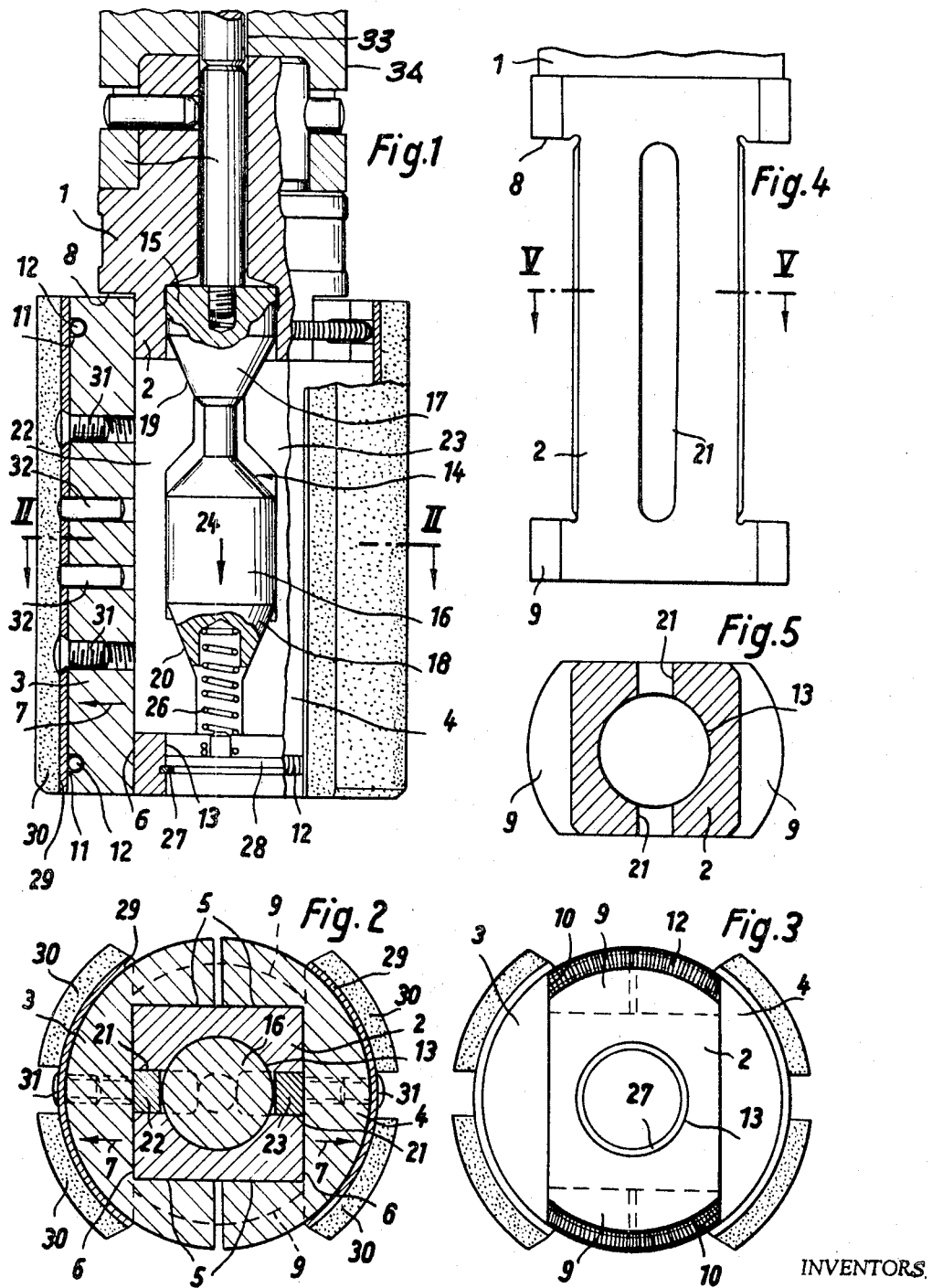

ABSTRACT OF THE DISCLOSURE

An improved adjustable honing tool embodying segmented cups that carry honing linings and which are supported for radial movement upon a tool body. The tool body has a rectangular cross-section that is received in complementary shaped portions of the cups for transmitting rotary movement from the tool body to the cups. A cone type adjusting mechanism is carried in the tool body for adjusting the radial position of the cups.

Background of the invention

One form of adjustable honing tool for bores has segmental cups radially guided relative to a tool body connectable to a hollow drive rod of a honing machine, said segmental cups being adapted to carry honing linings and to be radially and outwardly displaced by means of a double cone guided axially on the tool body and acted upon by a pressor rod of a spreader device guided in the drive rod of the honing machine.

Previously in a honing tool of this kind, two or more segmental cups having conical recesses at both ends are mounted on two conical rings which, together with a cylindrical spacer sleeve, are axially displaceable on a cylindrical part of the tool body. The presser rod of the spreader device acts against the conical ring on the driving end via a cotter engaging through longitudinal slots in the tool body.

The transmission of the torque from the tool body to the segmental cups is effected by driver pins mounted in radial bores in the tool body, which pins engage through longitudinal slots in the spacer sleeve into radial guide bores in the segmental cups. These driver pins have proved to be inadequate, since they frequently sheared if a great torque had to be transmitted at a high contact pressure. Relatively long driver keys provided instead of the driver pins have not been able to eliminate this disadvantage.

Further, the known arrangement is disadvantageous in that the entire conical contact surface of the segmental cups is supported on the conical rings in only a single operating position and, for the rest, abuts against the conical rings at only two points.

Summary of the invention

According to the present invention an adjustable honing tool for bores, comprising segmental cups radially guided relative to a tool body which are connected to a hollow drive rod of a honing machine, said segmental cups being adapted to carry a honing lining and being radially and outwardly displaceable by a multiple cone type spreader axially guided on the tool body and acted upon by a presser rod guided in the drive rod of the honing machine, said tool body having a rectangular cross section in the region of the segmental cups, and carrying two segmental cups, each substantially enclosing one half of the tool body, said segmental cups also being recessed to correspond to the rectangular cross section and being directly radially displaceable, whilst the multiple cone type spreader axially guided in a longitudinal bore of the tool body presses against a base surface of guide recesses of the segmental cups by means of two adjusting bars radially guided in two longitudinal slots in the tool body.

The torque can be transmitted to the segmental cups with such a slight surface pressure, by virtue of the great width and length of the side faces of the rigid tool body, that distortion cannot occur in any case. The two cones, in every operating position, have a great length of line contact with the oblique contact surfaces of the adjusting bars extending at the same angle of opening.

Preferably, the portion of the tool body having the rectangular cross section is the same length as the segmental cups and thus has the largest possible driving surface. Thereby the free end of the tool body has lugs projecting transversely to the direction of displacement of the segmental cups but parallel to the free end and engaging into appropriate recesses in the segmental cups and retaining the segmental cups in the axial direction.

The invention will now be further described by way of example with reference to the accompanying drawings, in which:

FIG. 1 shows a honing tool according to one embodiment of the invention, partly in axial section and partly in side elevation, FIG. 2 is a cross section taken on the line II—II in FIG. 1, FIG. 3 is an end view of the free end of the tool, FIG. 4 is a side elevation of the tool body, FIG. 5 is a section taken on the line V—V in FIG. 4.

The tool body has a head 1 for connecting to the hollow drive rod of the honing machine, and a square portion 2 extending to the free end. The square portion 2 serves to guide two segmental cups 3 and 4 each enclosing one half thereof, the cups being of equal length and having recesses adapted to the rectangular cross section, the side flanks of the recesses being designated 5 and their base surface being designated 6. The segmental cups 3 and 4 may be radially displaced in opposite directions 7 on the square portion 2 of the tool body. The segmental cups 3 and 4 are retained in an axial direction between a shoulder surface 8 on the connecting head 1 of the tool body and lugs 9 projecting transversely to their direction 7 of radial displacement on the free end and parallel to the free end of the tool body, said lugs engaging into corresponding recesses 10 in the segmental cups 3 and 4. The segmental cups 3 and 4 may be tensionally retained in the axial direction against the tool body by tubular springs 12 inserted in annular grooves 11.

A type of spreader 14 having two cylindrical portions 15 and 16 is displaceably accommodated in an axial bore 13 opening into the free end of the tool body. Two cones 17 and 18 tapered in substantially the same direction are contiguous to the two cylindrical portions 15 and 16. The two cones being able to co-operate with oblique surfaces 19 and 20 of adjusting bars 22 and 23 adapted to the conicity of the cones, said adjusting bars being radially displaceable in longitudinal slots 21 in the square tool body portion 2. The adjusting bars 22 and 23 abut against the base surface 6 of the guide recesses in the segmental cups 3 and 4 and move the segmental cups outwardly against the force of the tubular springs when they are outwardly displaced by the axial movement of the spreader 14 in the direction of the arrow 24 in FIG. 1. The displacement of the spreader 14 in the direction of the arrow 24 may be effected by a presser pin 25 guided in an axial bore in the head 1 of the tool body, a presser rod 33 of the spreader device guided in a hollow drive rod 34 of the honing machine being adjustable against the presser pin 25. A return spring 26 engages against the opposite end face of the spreader 14 and may be supported against a disc 28 retained in the axial bore 13 of the tool body 1, 2 by a spring ring 27.

Thin-walled cup portions 29 having the honing lining 30 are secured, in a known manner, to the segmental cups 3 and 4 by screws 31 and fixed in their position by press pins 32.

We claim:

1. An improved adjustable honing tool for bores having a tool body, a hollow drive rod on said tool body, adapted to be connected to a honing machine, segmental cups guided relative to said tool body and connectable to said hollow drive rod, which segmental cups are each adapted to carry at least one honing lining, and a spreader device axially displaceable on said tool body for causing outward radial displacement of said segmental cups, wherein the improvement comprises the tool body having a rectangular cross section in the region of the segmental cups on said tool body, said segmental cups each being recessed to correspond to the rectangular cross section of the tool body whereby to substantially enclose and be radially displaceable relative to one half of the tool body, said spreader device comprising a multiple cone type spreader axially guided in a longitudinal bore of the tool body, said tool body being provided with two longitudinal slots, a pair of adjusting bars one in each slot and each engaging the base of the recess in a segmental cup and being engaged by said spreader device.

2. An improved honing tool according to claim 1, wherein the portion of the tool body having the rectangular cross section has the same length as the segmental cups on said tool body; the free end of said tool body has lugs projecting transversely and parallel to the radial direction of displacement of the segmental cups on said tool body, said segmental cups having recesses which correspond to the aforementioned lugs on said tool body and so secure the segmental cups in the axial direction.

3. An improved honing tool according to claim 1 wherein the segmental cups on the tool body are restrained, by means of circular springs housed in grooves in the said segmental cups, against the spreader device initially and also when the honing linings on said segmental cups are not in contact with a workpiece bore.

4. An improved honing tool according to claim 1 wherein the axial displacement of the spreader device within the longitudinal bore of the tool body is achieved by means of a presser rod incorporated in the guide rod of the honing machine directly above the said tool body.

5. An improved honing tool according to claim 1, wherein the spreader type device is in the form of two cones on an axial stem.

References Cited

UNITED STATES PATENTS

| | | | |
|---|---|---|---|
| 1,831,172 | 11/1931 | Hall | 51—346 |
| 1,910,659 | 5/1933 | Tydeman | 51—344 |
| 2,299,224 | 10/1942 | Gjertsen | 51—345 |
| 2,411,633 | 11/1946 | Oberholtz | 51—345 |

FOREIGN PATENTS

| | | |
|---|---|---|
| 870,367 | 3/1953 | Germany. |

LESTER M. SWINGLE, Primary Examiner